United States Patent
Sogah et al.

(10) Patent No.: US 7,659,321 B2
(45) Date of Patent: Feb. 9, 2010

(54) PHOTOINITIATOR ANCHORED TO SILICATE AND USE THEREOF TO PREPARE POLYMER EXFOLIATED SILICATE NANOCOMPOSITE

(75) Inventors: Dotsevi Y. Sogah, Ithaca, NY (US); Jianbo Di, Evansville, IN (US); Xiao-Ping Chen, Bellmore, NY (US)

(73) Assignee: Cornell Research Foundation, Inc., Ithaca, NY (US)

(*) Notice: Subject to any disclaimer, the term of this patent is extended or adjusted under 35 U.S.C. 154(b) by 250 days.

(21) Appl. No.: 11/664,998

(22) PCT Filed: Nov. 9, 2005

(86) PCT No.: PCT/US2005/040611

§ 371 (c)(1),
(2), (4) Date: Apr. 10, 2007

(87) PCT Pub. No.: WO2006/055372

PCT Pub. Date: May 26, 2006

(65) Prior Publication Data

US 2009/0012199 A1    Jan. 8, 2009

Related U.S. Application Data

(60) Provisional application No. 60/628,172, filed on Nov. 17, 2004.

(51) Int. Cl.
*C08F 4/02* (2006.01)
*C08F 2/06* (2006.01)
*C08K 3/22* (2006.01)

(52) U.S. Cl. .............. 522/57; 522/68; 522/77; 522/79; 526/130; 526/154; 524/445; 524/447

(58) Field of Classification Search .......... 522/57, 522/68, 135, 904, 77, 79; 521/30; 526/130, 526/154; 524/445, 447
See application file for complete search history.

(56) References Cited

U.S. PATENT DOCUMENTS

2004/0097630 A1    5/2004    Whitman et al.
2004/0204521 A1    10/2004    Camenzind et al.

FOREIGN PATENT DOCUMENTS

WO    WO 04/000809 A1    12/2003

OTHER PUBLICATIONS

Di, J., et al., "Intergallery Living Polymerization Using Silicate-Anchored Photoiniferter. A Versatile Preparatory Method for Exfoliated Silicate Nanocomposites", Macromolecules 2006, 39, 1020-1028.
Weimer, M.W., et al., "Direct Synthesis of Dispersed Nanocomposites by in Situ Living Free Radical Polymerization Using a Silicate-Anchored Initiator",Jj. Am. Chem. Soc. 1999, 121, 1615-1616.
Otsu, T., "Iniferter Concept and Living Radical Polymerization", Journal of Polymer Science: Part A: Polymer Chemistry, vol. 38, 2121-2136 (2000).
Di, Jianbo,Ph.D., "Nanostructure and architecture control in polymer silicate nanocomposites", Cornell University, 2004, 226 pages; AAT 3114505—Abstract.

*Primary Examiner*—Susan W Berman
(74) *Attorney, Agent, or Firm*—Bacon & Thomas, PLLC

(57) ABSTRACT

Photoinitiator modified silicate and ethylenically unsaturated monomer are reacted in solvent to cause living polymerization of monomer and exfoliation of silicate layers and cause attachment of silicate layers to polymer chains, thereby providing dispersed homopolymer or block copolymer silicate nanocomposites.

18 Claims, No Drawings

PHOTOINITIATOR ANCHORED TO SILICATE AND USE THEREOF TO PREPARE POLYMER EXFOLIATED SILICATE NANOCOMPOSITE

CROSS-REFERENCE TO RELATED APPLICATIONS

This application is a 371 national stage filing of PCT/US2005/040611 which claims the benefit of U.S. Provisional Patent Application No. 60/628,172, filed Nov. 17, 2004, the whole of which is incorporated herein by reference.

The invention was made in part with United States Government support under National Science Foundation Grant Numbers DMR-0079992, DMR-9632275 and DMR-8314255. The Unites States Government has certain rights in the invention.

TECHNICAL FIELD

The invention is directed at photoinitiator modified silicate, method for forming dispersed polymer photoinitiator modified silicate nanocomposite, admixture for use in the method and nanocomposites produced by this method.

BACKGROUND OF THE INVENTION

Direct synthesis of dispersed polymer silicate nanocomposites has been carried out by living polymerization of styrene using a silicate anchored to 2,2,6,6 tetramethylpiperidine alkoxyamine, Weimer, M. W., et al, J. Am. Chem. Soc. 121, 1615-1616 (1999). This reaction has limitations since the initiator there is not efficient enough to polymerize methacrylates with reasonable conversion rates at acceptable temperatures.

Muhlebach et al WO 2004/000809A1 indicates that it improves upon the method described in the above paragraph to effectively produce dispersed polymer silicate nanocomposites where the polymer is obtained from acrylates or methacrylates or styrene by using certain different alkoxyamines anchored to natural or synthetic clay by a cationic anchor group. Examples of the anchoring compounds are set forth at pages 34 and 35 of WO 2004/000809A1.

The process described in WO 2004/000809A1 has the disadvantages that the anchoring compounds are all very complicated and the polymerizations are carried out in the working example of WO 2004/000809A1 at 140° C.

SUMMARY OF THE INVENTION

It has been discovered herein that the ubiquitous nature of WO 2004/000809A1 so far as monomers are concerned can be duplicated by using initiators anchored to silicate which are not required to be alkoxyamines and which can be much simpler in chemical structure than those of Muhlebach et al and can initiate polymerization at room temperature by using as initiator modified silicate, photoinitiator modified silicate or partially photoinitiator modified silicate.

In summary, photoinitiator modified silicate or partially photoinitiator modified silicate and ethylenically unsaturated monomer are reacted in solvent to cause living polymerization of monomer and dispersion of silicate layers and ionic attachment of polymer chains to silicate layers thereby providing dispersed polymer silicate nanocomposite.

In one embodiment of the invention herein, denoted the first embodiment, there is provided a photoinitiator for cation exchange attachment to a nanoclay comprising a photoinitiating moiety and a moiety for attaching to nanoclay by cation exchange.

In another embodiment of the invention herein, denoted the second embodiment, there is provided a nanoclay cation exchanged with the photoinitiator of the first embodiment or a nanoclay partially cation exchanged with (a) photoinitiator of the first embodiment and partially cation exchanged with (b) organic cation that does not contain photoinitiating moiety.

In still another embodiment of the invention herein, denoted the third embodiment, there is provided a method of preparing dispersed homopolymer or copolymer silicate nanocomposite from ethylenically unsaturated monomer and photoinitiator modified silicate or partially photoinitiator modified silicate comprising photopolymerizing ethylenically unsaturated monomer in organic solvent containing photoinitiator modified silicate or partially photoinitiator modified silicate to cause living polymerization of the monomer, and formation of nanocomposite with polymer chains ionically attached to exfoliated silicate layers dispersed in a polymer matrix.

In still another embodiment of the invention herein, denoted the fourth embodiment, there is provided an admixture for polymerization comprising ethylenically unsaturated monomer and photoinitiator modified silicate or partially photoinitiator modified silicate in a weight ratio of monomer to photoinitiator modified silicate or partially photoinitator modified silicate ranging from 400:1 to 1:2.

In still another embodiment of the invention herein, denoted the fifth embodiment, there is provided a dispersed poly(ethylenically unsaturated monomer) photoinitiator modified silicate or partially photoinitiator modified silicate nanocomposite where polymer chains are attached to photoinitiator modified silicate, where the weight ratio of polymer to photoinitiator modified silicate or partially photoinitiator modified silicate ranges from 400:1 to 1:2.

In still another embodiment of the invention herein, denoted the sixth embodiment, there is provided a dispersed poly(ethylenically unsaturated monomer)-block-poly(different entylenically unsaturated monomer) photoinitiator modified silicate or partially photoinitiated modified silicate nanocomposite where one end of first block polymer chain is attached to photoinitiator modified silicate and where the weight ratio of block copolymer to photoinitiator modified silicate or partially photoinitiator modified silicate ranges from 400:1 to 1:2, and where the volume ratio of poly(ethylenically unsaturated monomer) to poly(different ethylenically unsaturated monomer) ranges from 1:5 to 5:1.

As used herein, the term "nanoclay" means clay having nanometer thickness silicate platelets that can be modified to make clay complexes compatible with organic monomers and polymers.

As used herein, the term "nanocomposite" means composition of nanoclay in a polymer matrix. The term "dispersed" used in the term "dispersed polymer silicate nanocomposites" means that silicate platelets of the nanoclay are exfoliated into single layers (denoted "silicate layers" herein) which are randomly dispersed in a polymer matrix.

The term "photoinitiator" is used herein to mean a photoactive living radical initiator that induces free radical polymerization that proceeds via initiation, propagation, primary radical termination and transfer to initiator.

The term "photoinitiator modified silicate" is used herein to mean that photoinitiator is ionically or covalently attached to exfoliated silicate layers The term "partially photoinitiator modified silicate" is used herein to mean that (a) photoinitiator is ionically or covalently attached to part of the exfoliated silicate layers and (b) organic cation which does not contain photoinitiating moiety is ionically or covalently attached to another part of the exfoliated silicate layers, where the mole ratio of a:b ranges from 10:1 to 1:10 and, for example, ranges from 2:1 to 1:2, e.g., is 1:1

Weight average molecular weight ($M_w$), number average molecular weight ($M_n$) and polydispersity indexes (PDI) herein are determined by size extrusion chromatography (SEC) in tetrahydrofuran (THF) using Waters HPLC Ultrastyragel (Waters Associates) columns unless otherwise noted. Retention times were converted to polymer molecular weights using a calibration curve built from narrow molecular weight distribution polystyrene standards.

DETAILED DESCRIPTION

We turn now to the first embodiment

The photoinitiating moiety of the photoinitiator is preferably a benzyl dithiocarbamate moiety and the attaching moiety is preferably a benzyl trimethyl ammonium moiety.

The photoinitiator of the first embodiment is very preferably:

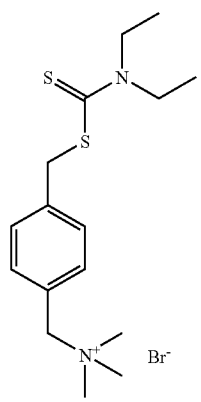

(I)

The compound 4-(N,N-diethyldithiocarbamylmethyl)benzyl trimethylammonium bromide can be made as described in Working Example I hereinafter.

We turn now to the second embodiment.

The product of the second embodiment which is nanoclay cation exchanged with photoinitiator of the first embodiment can be prepared by cation exchanging nanoclay, e.g., as obtained in inorganic cation form, e.g., in the sodium form, with the composition of the first embodiment. The product of the second embodiment which is nanoclay partially cation exchanged with photoinitiator can be prepared by cation exchanging nanoclay, e.g., as obtained in inorganic cation form, e.g., in the sodium form concurrently with (a) the composition of the first embodiment and (b) with organic cation that does not contain photoinitiating moiety where the mole ratio of a:b ranges from 10:1 to 1:10, e.g., from 2:1 to 1:2, e.g., is 1:1. The nanoclay is preferably montmorillonite (a natural clay) or fluorohectorite or laponite (synthetic clays). Other useful nanoclays include bentonites, beidellites, hectorites, saponites, nontronites, sauconites, vermiculites, ledikites, magadiites, kenyaites and stevensites. The nanoclays are normally purchased in the sodium form although some clays may contain other cations Any alkali metal cation (e.g., Li+, Na+, or K+) present in the clay is exchangeable with other cations. Exchanging the interlayer inorganic cations present with organic cation renders the nanoclay (silicate) more hydrophobic so the nanoclay is more readily swellable in organic media (so the silicate layers therein are more readily accessible to monomer) and renders the silicate layers more miscible with the polymer of the nanocomposite, which is formed in the third embodiment herein.

Preferably, the composition of the second embodiment is montmorillonite in an inorganic cation form cation exchanged with photoinitiator (I) or partially cation exchanged with photoinitiator (I) and partially cation exchanged with organic cation which does not contain photoinitiating moiety. Compositions of the second embodiment can be made as described in Working Examples II and IIa hereinafter.

We turn now to the first case of the third embodiment where dispersed homopolymer photoinitiator modified silicate or partially modified silicate nanocomposite is prepared.

The photoinitiator modified silicate can be any of the cation exchanged nanoclays of the second embodiment.

Preferably, the photoinitiator modified silicate is the montmorillonite whose interlayer alkali cations have been exchanged with (1) which is a preferred composition of the second embodiment Preferably also, the partially modified silicate is the montmorillonite whose interlayer alkali cations have been partially exchanged with (a) photoinitiator (I) and partially cation exchanged with (b) trimethylbenzyl ammonium chloride, when the mole ratio of a:b is 1:1.

The ethylenically unsaturated monomer is, for example, selected from the group consisting of styrene, methyl methacylate, tert-butyl methacylate, n-butyl methacrylate, 2-hydroxyethylmethacrylate 1,1,1,2,2-pentafluoropropyl methacrylate, (2-trimethysilyloxy)-ethyl-methacrylate, and tertbutyl acrylate The photopolymerization can be carried out on admixture of photoinitiator modified silicate or partially photoinitiator modified silicate, ethylenically unsaturated monomer and organic solvent by positioning the admixture so it receives ultraviolet irradiation (e.g., from a UV lamp), very suitably at room temperature. Preferably, the solvent is a dipolar aprotic solvent, very preferably, tetrahydrofuran, less preferably, dimethyl formamide, N-methyl pyrrolidone or dimethyl sulfoxide. The weight ratios of monomer:photoinitiator modified silicate or partially photoinitiator modified silicate, can be, for example, 400:1 to 1:2 Working examples of the first case of the third embodiment are Working Examples III, IV, IVA, V and VI below. Resulting polymer chains include those set forth below

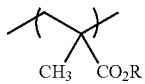

where R is, for example, 2-hydroxyethyl, 2-trimethylsiloxyethyl, tert-butyl, 2-hydroxyethyl, hydrogen, methyl or n-butyl, or the corresponding polyacrylates. Poly(acrylic acid) chains can be formed from poly(tert-butyl acrylate) chains by hydrolysis under mild acidic conditions. Poly(2-trimethylsiloxyethyl methacrylate) chains can be converted to hydroxyethyl methacrylate chains by treatment under mild acidic conditions.

The admixture for polymerization is the admixture of the fourth embodiment of the invention.

The nanocomposite produced by the method of the first case of the third embodiment is the nanocomposite of the fifth embodiment of the invention herein.

We turn now to the second case of the third embodiment where the method of the third embodiment is modified to make dispersed block copolymer photoinitiator modified silicate or partially photoinitiator modified silicate nanocomposite. In this case, living homopolymer nanocomposite made as described above is admixed with ethylenically unsaturated monomer for the second block and organic solvent and photopolymerization is carried out, e.g., as described above, e.g., at room temperature, with total monomer to modified silicate weight ratio ranging from 400:1 to 1:2. The one end of the block which is attached to photoinitiator modified silicate provides photoinitiator functionality to provide living polymerization of the second block. No silicate becomes dispersed in the second block. Dispersed block copolymer silicate nanocomposites have been made employing sequential monomer addition either first producing silicate-polystyrene living block and then carrying out polymerization of methyl methacrylate or by first producing silicate-poly(methyl methacrylate) living block and then carrying out polymerization of styrene. Working Example of the second case of the third embodiment is set forth in Working Example VII below.

The nanocomposite produced by the method of the second case of the third embodiment is the nanocomposite of the sixth embodiment of the invention herein.

The nanocomposites produced herein have significantly higher dynamic storage modulus than the neat homopolymer or copolymer (i.e., without nanoclay) at temperatures below the $T_g$ of the neat polymer or copolymer so they are deformed less compared to neat homopolymer or copolymer at the same stress at said temperatures.

The invention is illustrated in the following working examples.

Working Example I

Synthesis of the Photoinitiator 4-(N,N-Diethyldithiocarbamylmethyl)benzyl Trimethylammonium Bromide (2)

4-(N,N-diethyldithiocarbamylmethyl)benzyl trimethylammonium bromide (2). To a 1000-mL flask equipped with a stirring bar were added 4-(bromomethyl)benzyl trimethylammonium bromide (1) (prepared as described in Rammo, J., et al., Chimica Acta 251, 125-134 (1996) (8.60 g, 26.6 mmol), sodium N,N-diethyldithiocarbamate trihydrate (Aldrich) (12.0 g, 53.3 mmol), and acetone (200 mL). The mixture was stirred at room temperature for 24 hours. A white precipitate formed gradually. The precipitate was filtered and washed with technical acetone (500 mL×3). By-product NaCl can be removed as a solid by extraction with dry $CHCl_3$ for five hours. The white powder product was dried in a vacuum oven overnight. Yield: 10.4 g, (98.0%). $^1$H NMR: d(DMSO-$d_6$) 1.14-1.20 (m, 6H), 2.98 (s, 9H), 3.70-3.72 (q, 2H), 3.94-3.96 (q, 2H), 4.47 (s, 2H), 4.56 (s, 2H), 7.44-7.52 (q, 4H).

Working Example II

Synthesis of Photoinitiator 2 Modified Montmorillonite

A mixture of 4.97 g of montmorillonite in the sodium form (Cloisite® $Na^+$, 92 meq/100 gm clay of cation exchange capacity (CEC); Southern Clay Products, Gonzeles, Tex.), in 500 mL of distilled water was ultrasonicated overnight and stirred for one hour. 2.0 g of 4-(N,N-diethyldithiocarbamylmethyl)benzyl trimethylammonium bromide prepared as in Working Example I in 100 mL of distilled water was added. The reactive mixture was stirred for 48 h at RT and the resultant photoinitiator modified montmorillonite became a precipitate in water. The modified montmorillonite was obtained after filtration; washed with water till no precipitate was formed when 0.1 N of $AgNO_3$ aqueous solution was added to the filtrate; and freeze-dried. The loading of the organic photoinitiator component was 15.5% by weight based on the weight loss of the modified montmorillonite on TGA.

Working Example IIA

Synthesis of Partially Photoinitiator Modified Montmorillonite (MMT)

A mixture of 10.0 g of MMT in 250 mL of distilled water was ultrasonicated for half an hour and stirred at 50° C. overnight. A mixture of 1.45 g of 4-(N,N-diethyldithiocarbamylmethyl)benzyl trimethylammonium bromide (photoinitiator) and 1.37 g of trimethylbenzyl ammonium chloride (Bz) (photoinitiator:Bz=1:2, molar ratio) in 200 mL, of distilled water was dissolved at 50° C. and then added to the clay suspension with rigorous stirring. The reaction mixture was stirring for 6 h at 50° C. and overnight at RT. The modified MMT was obtained after filtration; washed with water till no precipitate was formed when 0.1 N of $AgNO_3$ aqueous solution was added in the filtrate; and dried by freeze-drier. Photoinitiator loading: 27.5 meq./100 g clay (photoinitiator:Bz=1:1). When the solvent was a mixture of ethanol:$H_2O$ (80:20, v/v), photoinitiator loading: 20 meq./100 g clay (photoinitiator:Bz=1:2).

Working Example III

Preparation of Polystyrene Silicate Nanocomposites

To a 3-neck round bottom flask equipped with a stirring bar were added the desired amounts of photoinitiator modified silicate made as described in Working Example II, styrene monomer, and THF (200 mL). Nitrogen gas was bubbled into the mixture with stirring for 30 min. A UV lamp positioned 10 cm away from the flask was turned on and left on for 48 hours. The temperature of the reaction flask was kept around room temperature by the air flow in the hood. Nitrogen gas was kept on throughout the whole process. At the end of the polymerization, the UV lamp was turned off and the mixture was diluted with THF (about 150 mL). The product was precipitated into methanol (10-fold excess). The while solid was filtered and dried in a vacuum oven. Amounts of photoinitiator modified silica and styrene (S) and polymerization results are given in Table 1 below:

TABLE 1

| Entry | Photoinitiator modified silicate (g) | S (mL) | Yield (%) | $M_n^a$ (CAL) × $10^{-3}$ | $M_n^b$ (SEC) × $10^{-3}$ | PDI[b] | Silicate weight %[c] |
|---|---|---|---|---|---|---|---|
| Silicate-PS-1 | 3.00 | 15.0 | 30.9 | 2.6 | 5.8 | 1.57 | 62.5 |
| Silicate-PS-2 | 2.50 | 20.0 | 44.0 | 5.9 | 13.6 | 1.52 | 27.1 |
| Silicate-PS-3 | 1.70 | 20.0 | 48.1 | 9.5 | 19.0 | 1.54 | 20.5 |
| Silicate-PS-4 | 5.00 | 50.0 | 42.0 | 7.1 | 28.3 | 1.53 | 17.2 |
| Silicate-PS-5 | 0.60 | 40.0 | 30.3 | 34.0 | 41.3 | 1.80 | 7.2 |
| Silicate-PS-6 | 0.50 | 80.0 | 45.5 | 122.5 | 102.0 | 2.02 | 0.7 |

[a]Calculated value based on monomer conversion and equivalent of initiator sites.
[b]Determined by SEC in THF using a Waters HPLC with Ultrastyragel (Waters Associates) columns. Retention times were converted to polymer molecular weights using a calibration curve built from narrow molecular weight distribution PS standards.
[c]Determined by TGA under $N_2$ on a Seiko thermogravimetric differential thermal analyzer using a heating rate of 5.0° C./min.

Working Example IV

Preparation of Poly(methylmethacrylate) Silicate Nanocomposites

Polymerizations were carried out as in Working Example III except that the monomer was methyl methacrylate. Amounts of photoinitiator modified silicate and methyl methacrylate (MMA) monomer and polymerization results are given in Table 2 below:

TABLE 2

| Entry | Photoinitiator modified silicate (g) | MMA (mL) | Yield (%) | $M_n^a$ (CAL) × $10^{-3}$ | $M_n^b$ (SEC) × $10^{-3}$ | PDI[b] | Silicate weight %[c] |
|---|---|---|---|---|---|---|---|
| Silicate-PMMA-1 | 4.00 | 30.0 | 73.8 | 9.6 | 48.2 | 1.56 | 15.6 |
| Silicate-PMMA-2 | 3.00 | 40.0 | 73.4 | 17.0 | 64.4 | 1.23 | 10.7 |
| Silicate-PMMA-3 | 2.70 | 60.0 | 75.6 | 29.0 | 70.4 | 1.73 | 7.5 |
| [d]Silicate-PMMA-4 | 4.10 | 40.0 | 72.6 | 12.3 | 96.8 | 1.27 | 12.8 |
| [d]Silicate-PMMA-5 | 3.00 | 100.0 | 65.5 | 37.8 | 146.9 | 1.46 | 5.6 |

[a]Calculated value based on monomer conversion and equivalent of initiator sites.
[b]Determined by SEC in THF using a Waters HPLC with Ultrastyragel (Waters Associates) columns. Retention times were converted to polymer molecular weights using a calibration curve built from narrow molecular weight distribution PS standards.
[c]Determined by TGA under $N_2$ on a Seiko thermogravimetric differential thermal analyzer using a heating rate of 5.0° C./min.
[d]Bulk polymerization.

Working Example IVA

Preparation of Poly(methylmethacrylate) Silicate Nanocomposites Using Partially Photoinitiator Modified Silicate The polymerization was carried out in bulk. A mixture of 0.29 g of partially modified MMT (photoinitiator:Bz=1:1) and 13.6 g of MMA was ultrasonicated for 0.5 h and stirred overnight. After flushing with a $N_2$ flow for 2 h, the reaction mixture was irradiation under UV light for 3 days. The resultant solid polymer was dissolved in THF and precipitated from hexanes, dried in a vacuum oven at 50° C. over night. 13.0 g of polymer nanocomposite was obtained with 1.9% of silicate. $M_n$ was 394,000 and PDI was 3.2. XRD spectrum was silent indicating the product could be an exfoliated polymer layered silicate nanocomposite.

Working Example V

Preparation of Poly(t-butyl acrylate) Silicate Nanocomposites

Polymerizations were carried out as in Working Example III except that the monomer was t-butyl acrylate and the purification procedure was different from that of Working Example III in that the polymer/THF mixture was kept under vacuum for 24 hours to remove all the solvent and the unreacted monomer. The resulting yellowish solid was ground into powder while being cooled in liquid nitrogen. Amounts of photoinitiator modified silicate, t-butyl acrylate monomer (PtBA) and polymerization results are given in Table 3 below:

TABLE 3

| Entry | Photoinitiator modified Silicate (g) | tBA (mL) | Yield (%) | $M_n^a$ (CAL) × $10^{-3}$ | $M_n^b$ (SEC) × $10^{-3}$ | PDI[b] | Silicate weight %[c] |
|---|---|---|---|---|---|---|---|
| Silicate-PtBA-1 | 3.50 | 30.0 | 71.2 | 10.0 | 12.6 | 1.63 | 17.8 |
| Silicate-PtBA-2 | 2.00 | 20.0 | 65.3 | 10.6 | 18.4 | 1.67 | 12.5 |
| Silicate-PtBA-3 | 2.00 | 50.0 | 68.2 | 27.6 | 30.5 | 1.67 | 5.7 |

[a]Calculated value based on monomer conversion and equivalent of initiator sites.
[b]Determined by SEC in THF using a Waters HPLC with Ultrastyragel (Waters Associates) columns. Retention times were converted to polymer molecular weights using a calibration curve built from narrow molecular weight distribution PS standards.
[c]Determined by TGA under $N_2$ on a Seiko thermogravimetric differential thermal analyzer using a heating rate of 5.0° C./min.

Working Example VI

Preparation of poly(n-butyl methacrylate) (nBMA) Silicate Nanocomposites 1.0 g of iniferter (photoinitiator) modified clay, prepared as described in Working Example II, was added in 30 mL of dry THF and flushed with a flow of $N_2$ for 1 h, and then ultrasonicated for half an hour. Then nBMA was added. The mixture was stirred for 2 h under a flow of $N_2$. The polymerization was carried out for 48 h at RT under UV irradiation with around 10 cm of distance between the UV lamp and the flask. The resultant polymer silicate nanocomposite in THF was precipitated from MeOH, and dried in a vacuum oven at 50° C. overnight. Amounts of nBMA and clay (IC) and polymerization results are given in Table 4 below:

TABLE 4

| Entry | nBMA (g) | IC[1] (g) | t[2] (h) | Conv.[3] (%) | NC[4] (g) | $M_{nGPC}$ | PDI | f[5] | Clay[6] (%) | XRD |
|---|---|---|---|---|---|---|---|---|---|---|
| 1 | 9.0 | 0.2 | 48 | 51.7 | 5.0 | 56,400 | 1.6 | 0.8 | 6.9 | Silent |
| 2 | 9.0 | 1.0 | 48 | 44.4 | 5.0 | 28,130 | 1.9 | 0.3 | 19.8 | Silent |
| 3 | 8.0 | 2.0 | 48 | 32.0 | 4.2 | 10,710 | 1.5 | 0.3 | 39.6 | Silent |
| 4 | 8.9 | 0.15[7] | 24 | 99.4 | 9.0[8] | 32,900 | 1.7 | 0.4 | | |

[1]Iniferter modified clay
[2]The time of UV irradiation
[3]Conv = $M_{PnBMA}/M_{nBMA} \times 100\%$
[4]Nanocomposite
[5]Initiation efficiency of initiator
[6]Percentage of clay in nanocomposite by TGA
[7]Weight of benzyl diethyldithiocarbamate (BDC). Entry 4 was carried out in bulk without THF
[8]Homopolymer Poly(n-butyl methacrylate) (PnBMA)
Entry 4 was carried out with BDC (without clay).

Instrom testing results on PnBMA silicate nanocomposite films are set forth in Table 5 below where MMT stands for montmorillonite and NC means nanocomposite.

TABLE 5

| Entry | Materials | Maximum Percent Strain (%) | Modulus (Young) (MPa) | Tensile Stress (MPa) | Toughness (MPa) |
|---|---|---|---|---|---|
| 1 | Control[2] | 304.4 | 287.8 | 17.6 | 35.6 |
| 2 | NC blending[3] (1.5 w % MMT) | 299.5 | 399.8 | 21.5 | 42.5 |
| 3 | NC[3] (8.6 w % MMT) | 76.5 | 584.3 | 26.2 | 10.0 |
| 4 | NC[4] (4.2 w % MMT) | 298.7 | 348.7 | 20.9 | 38.8 |

[1]The film samples were measured at 70 F. with 65% of humidity; the samples were stored for 3 days before measurement
[2]The control sample is the commercial PnBMA with $M_{w(GPC)} \sim 337,000$ after purification by precipitation in MeOH from THF solution of PnBMA
[3]The blending with overall 1.5 w % of MMT consists of PnBMA silicate nanocomposite (40 wt % MMT, $M_{nGPC}$ = 10,710, PDI = 17) and the purified commercial PnBMA.
[4]PnBMA silicate nanocomposite with PnBMA of $M_{n(GPC)}$ = 30,300, PDI = 16

Working Example VII

Preparation of Block Copolymer Silicate Nanocomposites

In this example PS means polystyrene and PMMA means poly(methyl methacrylate).

To a 3-neck round bottom flask equipped with a stirring bar were added either silicate-PS or silicate-PMMA (1.00 g) nanocomposite (depending on the desired first block) prepared respectively by the procedure of Working Example III or Working Example IV, monomer (MMA or styrene, 5.50 mL) (depending on the desired second block), and THF (100 mL). Nitrogen gas was bubbled into the mixture with stirring for 30 min. A UV lamp positioned 10 cm away from the flask was turned on and left on for 48 hours. The temperature of the reaction flask was kept around room temperature by the air flow in the hood. Nitrogen gas was kept on throughout the whole process. At the end of the polymerization, UV lamp was turned off. The product was precipitated into methanol (10-fold excess). The white solid was filtered and dried in a vacuum oven. Yield for silicate-PS-PMMA was 65.5%, and for silicate-PMMA-PS, 43.2%.

Amounts and results are set forth in Table 6 below.

TABLE 6

| Entry | Starting polymer (g) | Second Monomer (mL) | Yield (%) | $M_n{}^a$ (CAL) × $10^{-3}$ | $M_n{}^b$ (SEC) × $10^{-3}$ | $PDI^b$ |
|---|---|---|---|---|---|---|
| Silicate-PS | — | — | — | — | 11.0 | 1.60 |
| Silicate-PS-PMMA | 0.50 | 20.0 | 65.5 | 192.6 | 25.8 | 1.56 |
| Silicate-PMMA | — | — | — | — | 29.1 | 1.43 |
| Silicate-PMMA-PS | 0.50 | 20.0 | 43.2 | 145.4 | 47.8 | 1.59 |

$^a$Calculated value based on monomer conversion and equivalent of initiator sites.
$^b$Determined by SEC in THF using a Waters HPLC with Ultrastyragel (Waters Associates) columns. Retention times were converted to polymer molecular weights using a calibration curve built from narrow molecular weight distribution PS standards.

VARIATIONS

The foregoing description of the invention has been presented describing certain operable and preferred embodiments. It is not intended that the invention should be so limited since variations and modifications thereof will be obvious to those skilled in the art, all of which are within the spirit and scope of the invention.

What is claimed is:

1. Photoinitiator for cation exchange attachment to a nanoclay comprising a photoinitiating moiety and a moiety for attaching to nanoclay by cation exchange.

2. The photoinitiator of claim 1 where the photoinitiating moiety is a benzyl dithiocarbamate moiety and the attaching moiety is a benzyl trimethyl ammonium moiety.

3. The photoinitiator of claim 2 which is

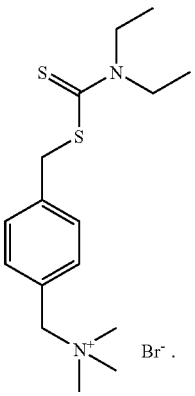

(I)

4. Nanoclay cation exchanged with the photoinitiator of claim 1.

5. The nanoclay of claim 4 where the photoinitiating moiety of the photoinitiator is a benzyl dithiocarbamate moiety and the attaching moiety of the photoinitiator is a benzyl trimethylammonium moiety.

6. The nanoclay of claim 5 where the cation exchange is with

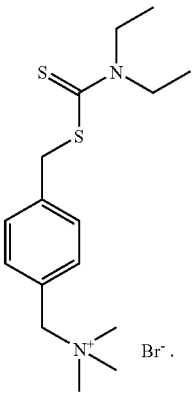

(I)

7. Nanoclay partially cation exchanged with (a) photoinitiator of claim 1 and partially cation exchanged with (b) organic cation that does not contain photoinitiating moiety where the mole ratio of a:b ranges from 10:1 to 1:10.

8. The nanoclay of claim 7 where (a) is

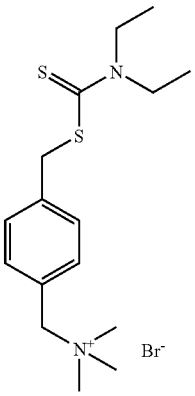

(I)

and (b) is trimethylbenzyl ammonium chloride.

9. A method for preparing homopolymer or copolymer dispersed silicate nanocomposite from ethylenically unsaturated monomer and photoinitiator modified silicate or partially photoinitiator modified silicate comprising photopolymerizing ethylenically unsaturated monomer in solvent containing photoinitiator-modified silicate to cause living polymerization of the monomer, with polymer chains in a nanocomposite ionically attached to exfoliated silicate layers dispersed in a polymer matrix.

10. The method of claim 9 where the solvent is a dipolar aprotic solvent.

11. The method of claim 10 where photoinitiator modified silicate is present and is nanoclay cation exchanged with photoinitiator comprising a photoinitiating moiety and a moiety for attaching to nanoclay by cation exchange.

12. The method of claim 10 where photoinitiator modified silicate is present and is nanoclay cation exchanged with

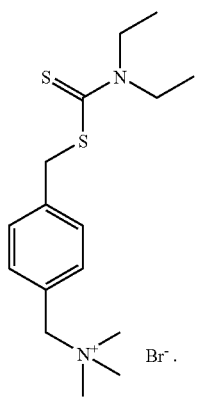
(I)

13. The method of claim 10 where partially photoinitiator modified silicate is present and is nanoclay partially cation exchanged with (a)

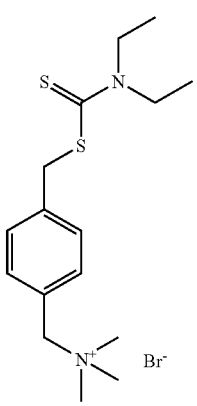
(I)

and partially cation exchanged with (b) organic cation that does not contain photoinitiating moiety, where the mole ratio of a:b ranges from 10:1 to 1:10.

14. The method of claim 10 where the ethylenically unsaturated monomer is selected from the group consisting of styrene, methyl methacrylate, tert-butyl methacrylate, n-butyl methacylate, 1,1,1,2,2-pentafluoropropyl methacrylate, (2-trimethylsilyloxy)-ethyl-methacrylate and tert-butylacrylate.

15. The method of claim 14 where sequential monomer addition is employed either first producing silicate-polystyrene living block and then polymerizing methyl methacrylate from it or first producing silicate-poly(methyl methacrylate) living block and then polymerizing styrene from it.

16. Admixture for polymerization comprising ethylenically unsaturated monomer and photoinitiator modified silicate or partially photoinitiator modified silicate, in a weight ratio ranging from 400:1 to 1:2.

17. Dispersed poly(ethylenically unsaturated monomer) photoinitiator modified silicate or partially photoinitiator modified silicate nanocomposite where polymer chains are attached to photoinitiator modified silicate, where the weight ratio of polymer to photoinitiator modified silicate or partially photoinitiator modified silicate ranges from 400:1 to 1:2.

18. Dispersed poly(ethylenically unsaturated monomer)-block-poly(different ethylenically unsaturated monomer) photoinitiator modified silicate or partially photoinitiator modified silicate nanocomposite where one end of the first block polymer chain is attached to photoinitiator modified silicate and where the weight ratio of block copolymer to photoinitiator modified silicate or partially photoinitiator modified silicate ranges from 400:1 to 1:2, and where the volume ratio of poly(ethylenically unsaturated monomer) to poly(different ethylenically unsaturated monomer) ranges from 1:5 to 5:1.

* * * * *